US012154586B2

(12) United States Patent
Zheng et al.

(10) Patent No.: US 12,154,586 B2
(45) Date of Patent: Nov. 26, 2024

(54) SYSTEM AND METHOD FOR SUPPRESSING NOISE FROM AUDIO SIGNAL

(71) Applicant: Agora Lab, Inc., Santa Clara, CA (US)

(72) Inventors: Jimeng Zheng, Guangzhou (CN); Bo Wu, Guangzhou (CN); Xiaohan Zhao, Shanghai (CN); Liangliang Wang, Guangzhou (CN); Ruofei Chen, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 203 days.

(21) Appl. No.: 17/751,935

(22) Filed: May 24, 2022

(65) Prior Publication Data

US 2023/0386492 A1 Nov. 30, 2023

(51) Int. Cl.

| | |
|---|---|
| ***G10L 21/0224*** | (2013.01) |
| ***G10L 21/0232*** | (2013.01) |
| ***G10L 25/18*** | (2013.01) |
| ***G10L 25/30*** | (2013.01) |
| ***G10L 25/57*** | (2013.01) |
| ***G10L 25/84*** | (2013.01) |

(52) U.S. Cl.

CPC ...... *G10L 21/0224* (2013.01); *G10L 21/0232* (2013.01); *G10L 25/18* (2013.01); *G10L 25/30* (2013.01); *G10L 25/57* (2013.01); *G10L 25/84* (2013.01)

(58) Field of Classification Search

None

See application file for complete search history.

(56) References Cited

U.S. PATENT DOCUMENTS

| | | | | |
|---|---|---|---|---|
| 10,854,217 | B1 * | 12/2020 | Lin | G06N 3/08 |
| 2010/0145687 | A1 * | 6/2010 | Huo | G10L 21/0208<br>704/226 |
| 2014/0037100 | A1 * | 2/2014 | Giesbrecht | H04R 3/005<br>381/71.8 |
| 2017/0236528 | A1 * | 8/2017 | Lepauloux | G10L 21/0232<br>704/233 |
| 2019/0172476 | A1 * | 6/2019 | Wung | G10L 21/0232 |
| 2019/0318755 | A1 * | 10/2019 | Tashev | G06N 3/045 |

(Continued)

OTHER PUBLICATIONS

Mirsamadi et al. "A Causal Speech Enhancement Approach Combining Data-driven Learning and Suppression Rule Estimation". Interspeech 2016 (Year: 2016).*

*Primary Examiner* — Jesse S Pullias

(74) *Attorney, Agent, or Firm* — The Law Offices of Konrad Sherinian, LLC; Depeng Bi

(57) ABSTRACT

A computer-implemented method for suppressing noise from audio signal uses both statistical noise estimation and neural network noise estimation to achieve more desirable noise reduction. The method is performed by a noise suppression computer software application running on an electronic device. The noise suppression computer software application first transforms the speech signal in time domain into frequency domain before determining a statistical noise estimate and a neural network noise estimate. The noise suppression computer software application merges the two noise estimates to derive a final noise estimate, and determines and refines a noise suppression filter. The filter is applied to the speech signal in frequency domain to obtain an enhanced signal. The enhanced signal is transformed back into time domain.

10 Claims, 5 Drawing Sheets

(56) References Cited

U.S. PATENT DOCUMENTS

| | | | | |
|---|---|---|---|---|
| 2020/0066296 | A1* | 2/2020 | Sargsyan | G10L 21/0232 |
| 2020/0211580 | A1* | 7/2020 | Lee | G06F 17/18 |
| 2023/0162758 | A1* | 5/2023 | Borgstrom | G10L 25/24<br>704/200 |

* cited by examiner

100

SYSTEM AND METHOD FOR SUPPRESSING NOISE FROM AUDIO SIGNAL

CROSS REFERENCE TO RELATED APPLICATIONS

NONE.

FIELD OF THE DISCLOSURE

The present invention generally relates to noise suppression in voice communication, and more particularly relates to a system and method for suppressing noise from audio data. More particularly still, the present disclosure relates to a system and method for suppressing noise from speech with both statistical based noise processing and neural network based noise processing.

DESCRIPTION OF BACKGROUND

In real-time communication over the Internet, sound is transmitted from the source to the destination. The sound is represented by audio signals that encode all the necessary information required to reproduce the sound on the receiving side. However, various types of noise are oftentimes present on the sending side. Noise suppression is thus desirable. Some noise suppression methods are based on statistical signal processing. Digital audio signal processing usually involves extracting audio features from the audio signals. Audio features describe a sound or an audio signal of the sound. Different audio features capture different characteristics and aspects of the sound.

The statistical signal processing based noise suppression technology usually can be effective when the noises are capable of being modeled with a set of rules or audio features (or features for short). In such cases, the rules and features can be updated easily according to the practical cases and thus make the noise suppression extensible and interpretable. However, obtaining accurate estimated audio features online renders the noise suppression module slow in response to changes in noise. Consequently, the noise suppression methods based on statistical signal processing is only effective in cases with statistically stable noises. When the noises frequently change, the noise suppression methods based on statistical signal processing become ineffective and even counterproductive. Furthermore, the rules to describe the noises are based on prior knowledge and introduced for the sake of simplicity in audio signal process. Accordingly, the noise suppression methods based on statistical signal processing usually is associated with suboptimal performance. The performance becomes worse when the noise is complex.

Neural networks (NN), also known as artificial neural networks (ANNs) and simulated neural networks (SNNs), are machine learning and include deep learning algorithms. Neural networks rely on training data to learn and improve their accuracy over time. Neural networks have a powerful ability to model different kinds of noise. Therefore, noise suppression methods using neural networks (also referred to as artificial intelligence (AI)) are effective to suppress complex noises, such as fast time-varying noises, multiple mixed noises and reverberant noises. However, the performance of neural network based noise suppression methods (also referred to herein as AI based noise suppression methods) are heavily dependent on the training data. In other words, when the training data sets are rich, the noise suppression methods can achieve optimal performance. Nonetheless, collecting training data covering a comprehensive set of scenarios is oftentimes time-consuming and costly. Consequently, neural network based noise suppression methods are usually feasible to suppress noises of certain specific scenarios. When the neural network based noise suppression methods fail to effectively suppress certain noises, such noises should be added to the training data sets. Thereafter, the training process of the neural network based noise suppression model is repeated until the noise suppression methods become effective to handle such noises. The training-test-retraining processes of the neural network based noise suppression methods are hard to refine quickly. Such a problem is exasperated when online minor problems frequently occur.

Accordingly, there is a need for a new noise suppression system and method that overcomes the disadvantages of the neural network based noise suppression methods and the statistical signal processing based noise suppression methods. In particular, there is a need for a new noise suppression system and method that fuse the neural network based noise suppression methods and the statistical signal processing based noise suppression methods.

SUMMARY OF THE DISCLOSURE

Generally speaking, pursuant to the various embodiments, the present disclosure provides a computer-implemented method for suppressing noise from audio signal. The method is performed by a noise suppression computer software application and includes retrieving an audio input signal in time domain; analyzing the audio input signal to map the audio input signal to a frequency domain signal; determining a speech presence probability from the frequency domain signal; performing an artificial intelligence (AI) analysis on the frequency domain signal to obtain a voice activity detection (VAD) knowledge and an AI based noise estimation result using a neural network; performing noise estimation with the speech presence probability and the voice activity detection knowledge using a statistical noise estimation method to obtain a statistically estimated noise; detecting voice activity in the frequency domain signal by applying a VAD model on the AI based noise estimation result to obtain a neural network estimated noise; merging the statistically estimated noise and the neural network estimated noise to generate a final noise estimation result; calculating a gain filter from the final noise estimation result; applying the gain filter to the frequency domain signal to suppress noise from the frequency domain signal to generate an enhanced speech signal; and converting the enhanced speech signal to a noise suppressed speech signal in time domain. The speech presence probability is estimated by extracting a set of speech features from the frequency domain signal; and mapping the set of speech features to the speech presence probability. The set of speech features includes at least one of a signal classification feature, a speech/noise log likelihood ratio, a post signal to noise ratio, and a prior signal to noise ratio. The neural network is Recurrent Neural Network (RNN) or a Long Short-Term Memory network (LSTM). The statistically estimated noise is obtained using a time recursive average formula. The noise suppression computer software application merges the statistically estimated noise and the neural network estimated noise using a maximum operator. The gain filter is a Wiener filter or a log Minimum Mean-Square Error filter. The gain filter is refined using at least one of a smoothing process and a mapping process before the gain filter is applied to the frequency domain signal. Analyzing the audio input signal comprises buffering audio samples of the audio input signal, windowing the buffered audio input signal and transforming the windowed audio samples into the frequency domain signal. Windowing the buffered audio input signal includes multiplying the buffered audio input signal by a hamming or sine waveform, and transforming the windowed audio samples includes a discrete Fourier transformation.

Further in accordance with the present teachings is a noise suppression computer software application for suppressing noise from audio signal. The noise suppression computer software application includes an audio signal analysis module, a speech presence probability estimation module, a first round noise estimation module, an artificial intelligence based noise estimation module, a voice activity detection module, an estimated noise merging module, a noise suppression gain filter calculation module, a noise suppression gain filter refinement module, a noise suppression gain filter application module, and a speech signal synthesis module. The noise suppression computer software application is adapted to be executed by an electronic device. The electronic device includes a processing unit; a memory operatively coupled to the processing unit; an audio input interface operatively coupled to the processing unit; an audio output interface operatively coupled to the processing unit; a video input interface operatively coupled to the processing unit; a video output interface operatively coupled to the processing unit; and a wireless network interface operatively coupled to the processing unit. The noise suppression computer software application is adapted to retrieve an audio input signal in time domain; analyze the audio input signal to map the audio input signal to a frequency domain signal; determine a speech presence probability from the frequency domain signal; perform an artificial intelligence (AI) analysis on the frequency domain signal to obtain a voice activity detection (VAD) knowledge and an AI based noise estimation result using a neural network; perform noise estimation with the speech presence probability and the voice activity detection knowledge using a statistical noise estimation method to obtain a statistically estimated noise; detect voice activity in the frequency domain signal by applying a VAD model on the AI based noise estimation result to obtain a neural network estimated noise; merge the statistically estimated noise and the neural network estimated noise to generate a final noise estimation result; calculate a gain filter from the final noise estimation result; apply the gain filter to the frequency domain signal to suppress noise from the frequency domain signal to generate an enhanced speech signal; and convert the enhanced speech signal to a noise suppressed speech signal in time domain. The speech presence probability is estimated by extracting a set of speech features from the frequency domain signal; and mapping the set of speech features to the speech presence probability. The set of speech features includes at least one of a signal classification feature, a speech/noise log likelihood ratio, a post signal to noise ratio, and a prior signal to noise ratio. The neural network is Recurrent Neural Network (RNN) or a Long Short-Term Memory network (LSTM). The statistically estimated noise is obtained using a time recursive average formula. The noise suppression computer software application merges the statistically estimated noise and the neural network estimated noise using a maximum operator. The gain filter is a Wiener filter or a log Minimum Mean-Square Error filter. The gain filter is refined using at least one of a smoothing process and a mapping process before the gain filter is applied to the frequency domain signal. The noise suppression computer software application analyzes the audio input signal by buffering audio samples of the audio input signal, windowing the buffered audio input signal and transforming the windowed audio samples into the frequency domain signal. The noise suppression computer software application windows the buffered audio input signal by multiplying the buffered audio input signal by a hamming or sine waveform, and transforming the windowed audio samples includes a discrete Fourier transformation

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
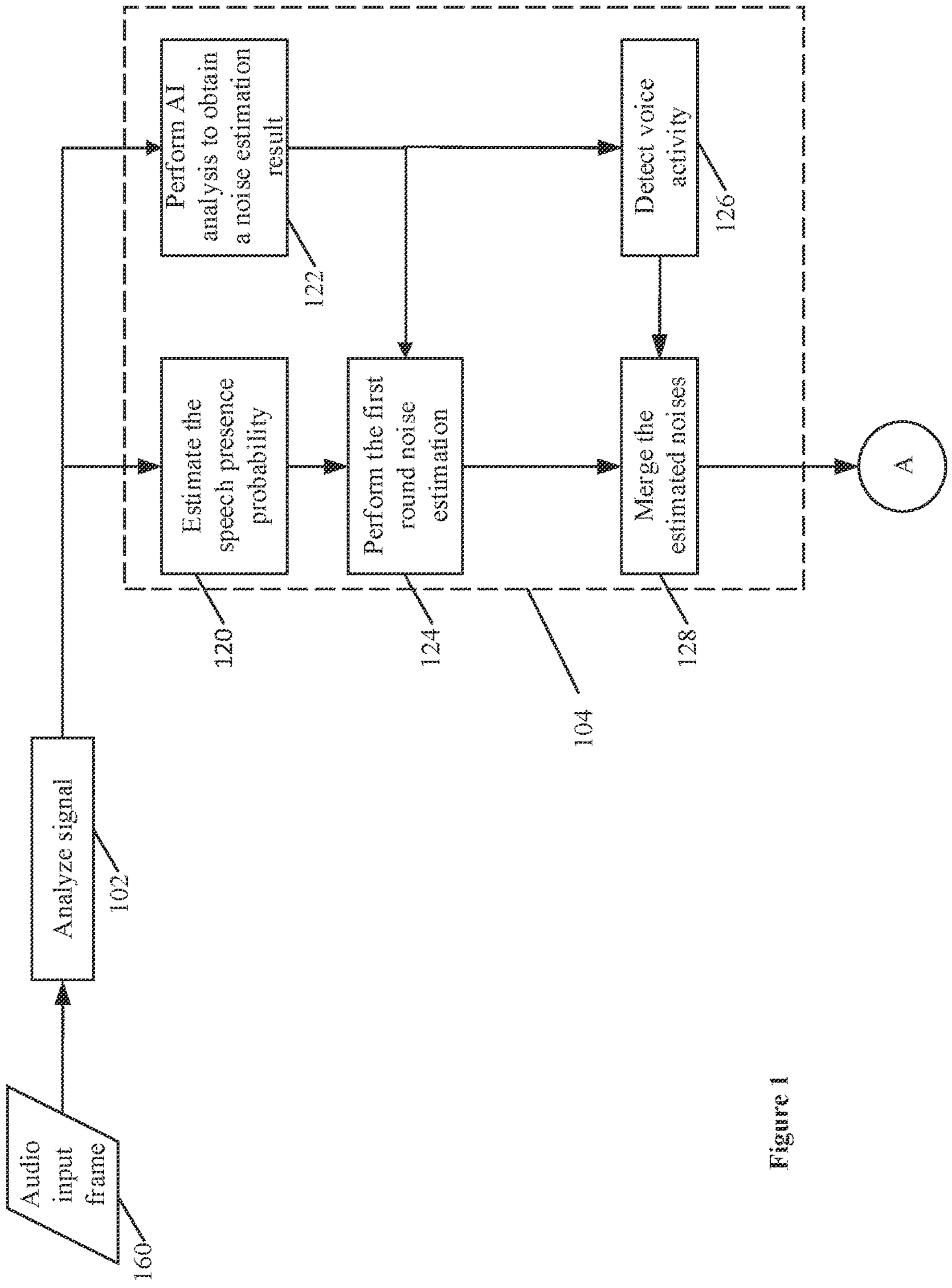
FIG. 1 is a flowchart depicting a process by which an electronic device suppresses noise from audio signals in accordance with this disclosure.
Figure 2:
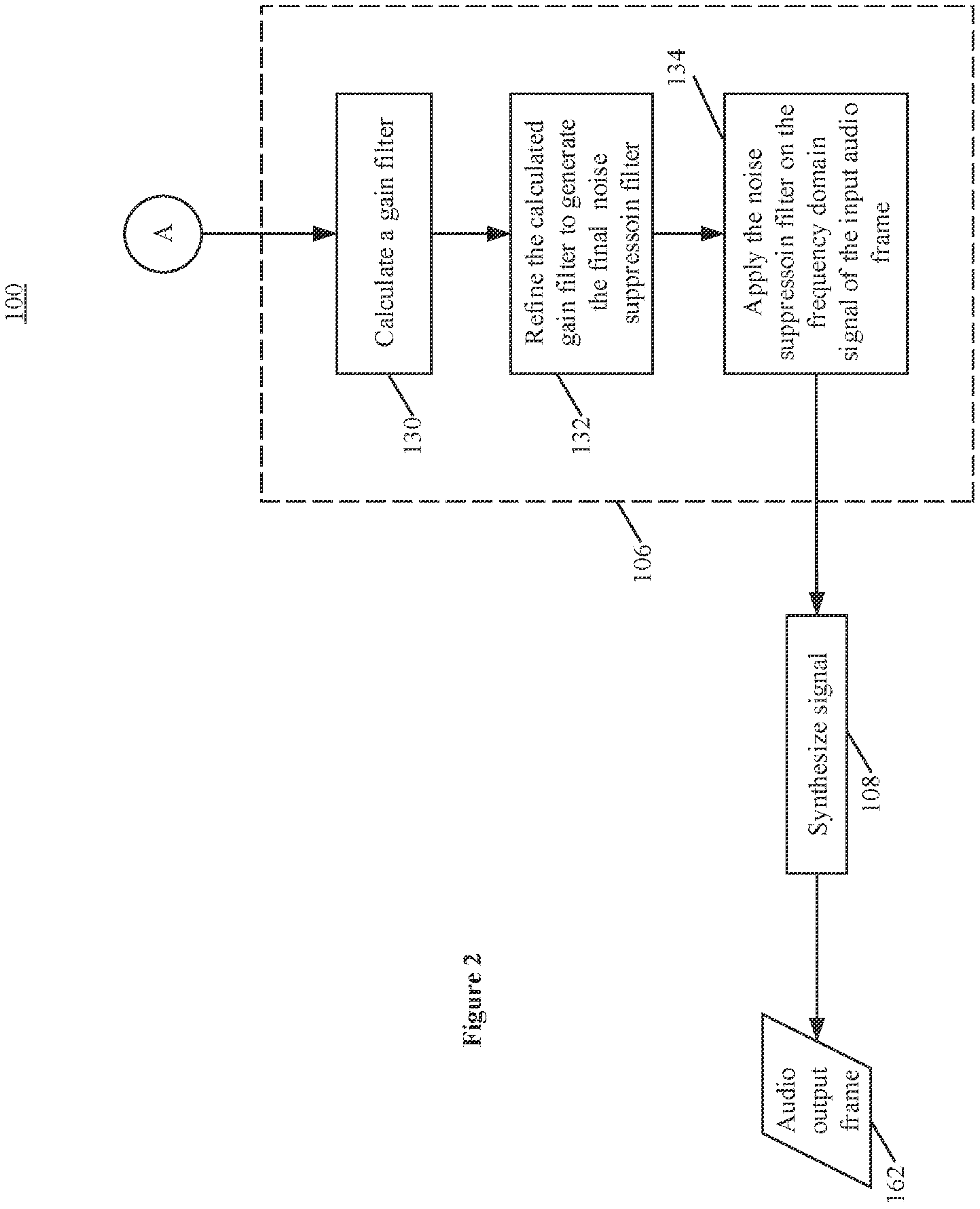
FIG. 2 is a flowchart depicting a process by which an electronic device suppresses noise from audio signals in accordance with this disclosure.

Turning to the Figures and to FIGS. 1 and 2 in particular, a flowchart diagram illustrating a new method for suppressing noise from audio signals is shown and generally indicated at 100. The illustrative flowchart 100 continues from FIG. 1 to FIG. 2. The continuity is indicated by the bubble A. The new noise suppression method 100 overcomes the disadvantages of the neural network based noise suppression methods and the statistical signal processing based noise suppression methods. The method 100 further obtains the benefits of both the neural network based noise suppression methods and the statistical signal processing based noise suppression methods. In one implementation, the new method 100 is performed by a new noise suppression software application running on an electronic device, such as a laptop computer, a tablet computer, a smartphone, a desktop computer, or other types of electronic devices. The noise suppression software application and the electronic device are further illustrated in FIG. 5 and indicated at 522 and 500 respectively.

The elements of the noise suppression method 100 are performed by one or more components or modules of the noise suppression software application 522. Alternatively, they are performed by one or more noise suppression software applications 522 with each application including one or more such modules. For simplicity and clarity of illustration, each element of the noise suppression method 100 is said to be performed by a corresponding software component (also referred to herein as module) of the noise suppression software application 522; and the noise suppression software application 522 is thus also referred to herein as a noise suppression system. Accordingly, the noise suppression method 100 is also interchangeably referred to herein as a noise suppression system. The noise suppression computer software application 522 thus includes an audio signal analysis module, a speech presence probability estimation module, a first round noise estimation module, an AI based noise estimation module, a voice activity detection module, an estimated noise merging module, a noise suppression gain filter calculation module, a noise suppression gain filter refinement module, a noise suppression gain filter application module, and a speech signal synthesis module.

The noise suppression method 100 includes four main processes—a signal analysis process 102, a noise estimation process 104, a noise suppression process 106 and a signal synthesis process 108. The signal analysis process 102 is performed on an input speech frame y(t), indicated at 160. The audio input frame 160 is speech signal with noise. At 102, the noise suppression software application 522 retrieves the audio input signal 160, and analyzes the audio input frame 160 to map it to a frequency domain signal Y(t,k). y(t) stands for a time domain speech signal sequence containing a specific length of speech. t stands for the time index while k stands for the frequency bin index. The signal analysis process 102 maps the input time domain speech signal 160 to the frequency domain spectrum. Differences between different types of noise sources are more evident in the frequency domain than in the time domain. It is thus more desirable to suppress noises in the frequency domain. The signal analysis process 102 allows noise suppression to proceed in the frequency domain.

The noise estimation process 104 includes four components—speech presence probability estimation 120, AI analysis 122, first round noise estimation 124, different noise estimation merge 126, and voice activity detection (VAD) 130. The noise suppression process 106 includes three components—gain calculation 130, gain post processing 132, and gain application 134. The signal synthesis process 108 converts the frequency domain enhanced signal back to the time domain. The signal synthesis process 108 outputs the estimated speech frame ŷ(t) 162.

At 120, the noise suppression software application 522 estimates the speech presence probability from the audio signal in the frequency domain output from the signal analysis process 102. The speech presence probability estimation plays an essential role in noise estimation and speech enhancement. It locates speech portions in frequency domain. The greater the speech presence probability, the greater the possibility of speech. Similarly, the smaller the speech presence probability, the greater the possibility of noise in the audio input frame 160. From the input Y(t,k) from the signal analysis process 102, at 120, the noise suppression software application 522 extracts a set of speech features F(t,k), such as signal classification features. The feature data can be a function of the input speech. For example, the features may include speech/noise log likelihood ratio, speech spectrum template difference, speech spectrum flatness, post, prior signal to noise ratios (SNRs), and other types of feature data. Based on feature data F(t,k) of the audio signal, speech presence probability P(t, k) is determined by a mapping function $f(\bullet)$:

$$P(t,k)=f(F(t,k)),$$

where $f(\bullet)$ denotes a function mapping the feature data to a speech presence probability.

At 122, the noise suppression software application 522 performs an artificial intelligence (AI) analysis on the frequency domain signal Y(t,k) to obtain an AI based noise estimation result $N_{ai}(t,k)$. The AI analysis uses a well-trained speech enhancement model, such as a Recurrent Neural Network (RNN) or a Long Short-Term Memory network (LSTM). At 122, the noise suppression software application 522 updates voice activity detection knowledge, and estimates noises, especially complex noise, from the input speech 160. Voice activity detection (VAD), also known as speech activity detection and speech detection in time and frequency domain, is the detection of the presence or absence of human speech.

Neural networks (NN) have a powerful ability to model different kinds of noise. Prepared noise speech data can be used to train RNN or LSTM networks to obtain an AI model. The AI model is used to determine VAD knowledge V(t, k) and AI based noise estimation results $N_{ai}(t,k)$. V(t, k) is used to detect the presence or absence of human speech, used in the speech processing pipeline. In one implementation, V(t,k)=0 means that the time-frequency data is noise while V(t,k)=1 means that the time-frequency data is speech.

At 124, the noise suppression software application 522 performs the first round noise estimation using a statistical based noise estimation method with the estimated speech presence probability and the VAD knowledge as the input to update the noise estimation at the current time. In a further implementation, at 124, the noise suppression software application 522 performs recursive smoothing of the current noise estimation in time to obtain the first round noise estimation results. As used herein, it is also said, at 124, the noise suppression software application 522 performs a statistical method noise estimation to determine the statistically estimated noise.

At 124, using the speech presence probability P(t, k) and VAP knowledge V(t, k), a time recursive average method is used to obtain the first round noise estimation results $N_1$ (t, k) using the formulas below:

$$N_1(t,k) = \alpha N_1(t-1,k) + (1-\alpha)N_{inst}(t,k),$$

$$N_{inst}(t,k) = \begin{cases} N_1(t-1,k), & \text{if } P(t,k) > P_0 \ \&\ V(t,k) = \text{true} \\ |Y(t,k)|, & \text{if } V(t,k) = \text{false} \\ P(t,k)N_1(t-1,k) + (1-P(t,k))|Y(t,k)|, & \text{if } P(t,k) < P_1 \ \&\ V(t,k) = \text{true} \end{cases}$$

Where $0<\alpha<1$ is a smoothing factor. $0<P_0<1$, $0<P_1<1$ are constant values used for decision threshold, |Y(t,k)| is the amplitude of Y(t,k).

In one implementation, $N_1$ (t, k) represents the average values of noise obtained by a long time smoothing, and is not be the exact values of noise. At 126, the noise suppression software application 522 detects voice activity in the speech frame by applying a VAD model on the AI noise estimation $N_{ai}(t,k)$ to filter out the incorrectly estimated noise signal.

Furthermore, at 126, the noise suppression software application 522 preserves desired speech signal that is included in the AI noise estimation $N_{ai}(t,k)$. The neural network estimated noise produced by the VAD module at 126 is denoted as $N_2(t, k)$:

$$N_2(t, k) = \begin{cases} N_{ai}(t, k), & \text{otherwise} \\ 0, & \text{if } N_{ai}(t, k) \text{ includes speech} \end{cases}.$$

At 128, the noise suppression software application 522 merges the estimated noises $N_1(t, k)$ and $N_2(t, k)$ to generate the final noise estimation results N(t, k). In one implementation, the final estimated noise N(t, k) is obtained using the formula below:

$$N(t,k)=\max(N_1(t,k),N_2(t,k))$$

Where max(•) is the operator to decide the maximum value of $N_1(t,k)$ and $N_2(t,k)$.

Using the maximum value of the statistically estimated noise and the AI estimated noise helps to suppress more noise. As set forth above, $N_2$ (t, k) very accurate for the majority of cases with complex noises, such as fast time-varying noises, multiple mixed noises and reverberant noises. However, when the AI based noise estimation is not very accurate, meaning that is $N_2$ (t, k) is underestimated, $N_1$ (t, k) is then considered as the final noise estimation.

At 130, the noise suppression software application 522 calculates a gain from the final noise estimation N(t, k). The calculated gain $G_0(t, k)$ is a set of time-frequency domain filter coefficients, which are between 0 and 1. The gain is a noise suppression filter obtained using, for example, the Wiener, log-MMSE, or other methods. When the Wiener method is used, the calculated gain filter is referenced as a Wiener filer. When the log-MMSE (standing for Minimum Mean-Square Error) method is used, the calculated gain filter is referenced as a log-MMSE filer.

At 132, the noise suppression software application 522 refines the gain filter determined at 130 to obtain the final gain filter G(t, k). The post processing 132 includes smoothing, mapping, and/or other processing, based on particular requirements. Smoothing the noise suppression filter avoids discontinuities. The mapping operation boosts the noise suppression filter on interested spectrum and reducing the noise spectrum gain. It also refines the frequency gain curves according to the human auditory characteristics.

At 134, the noise suppression software application 522 applies the noise suppression filter to the input speech frequency domain signal Y(t,k) to suppress the undesired noise to generate the enhanced speech signal $\hat{Y}(t,k)$. The gain application is further shown below:

$$\hat{Y}(t,k)=Y(t,k(G(t,k)$$

At 108, the noise suppression software application 522 converts the frequency domain enhanced signal $\hat{Y}(t,k)$ back to the time domain signal $\hat{y}(t)$ 162. The time domain signal $\hat{y}(t)$ 162 is also referred herein as the noise suppressed audio output frame, noise suppressed speech signal, and noise suppressed audio frame.

Figure 3:
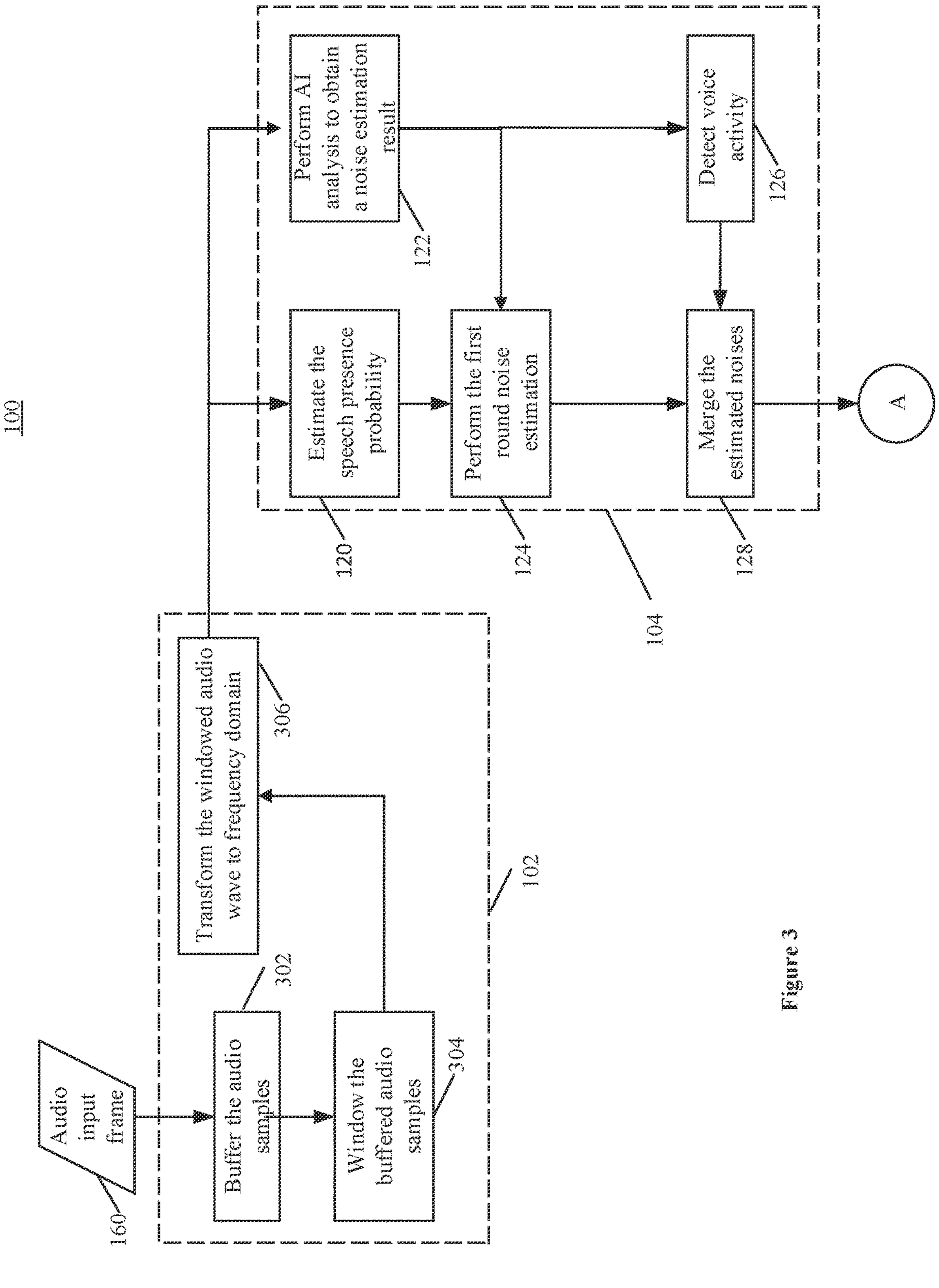
FIG. 3 is a flowchart depicting a process by which an electronic device suppresses noise from audio signals in accordance with this disclosure.
Figure 4:
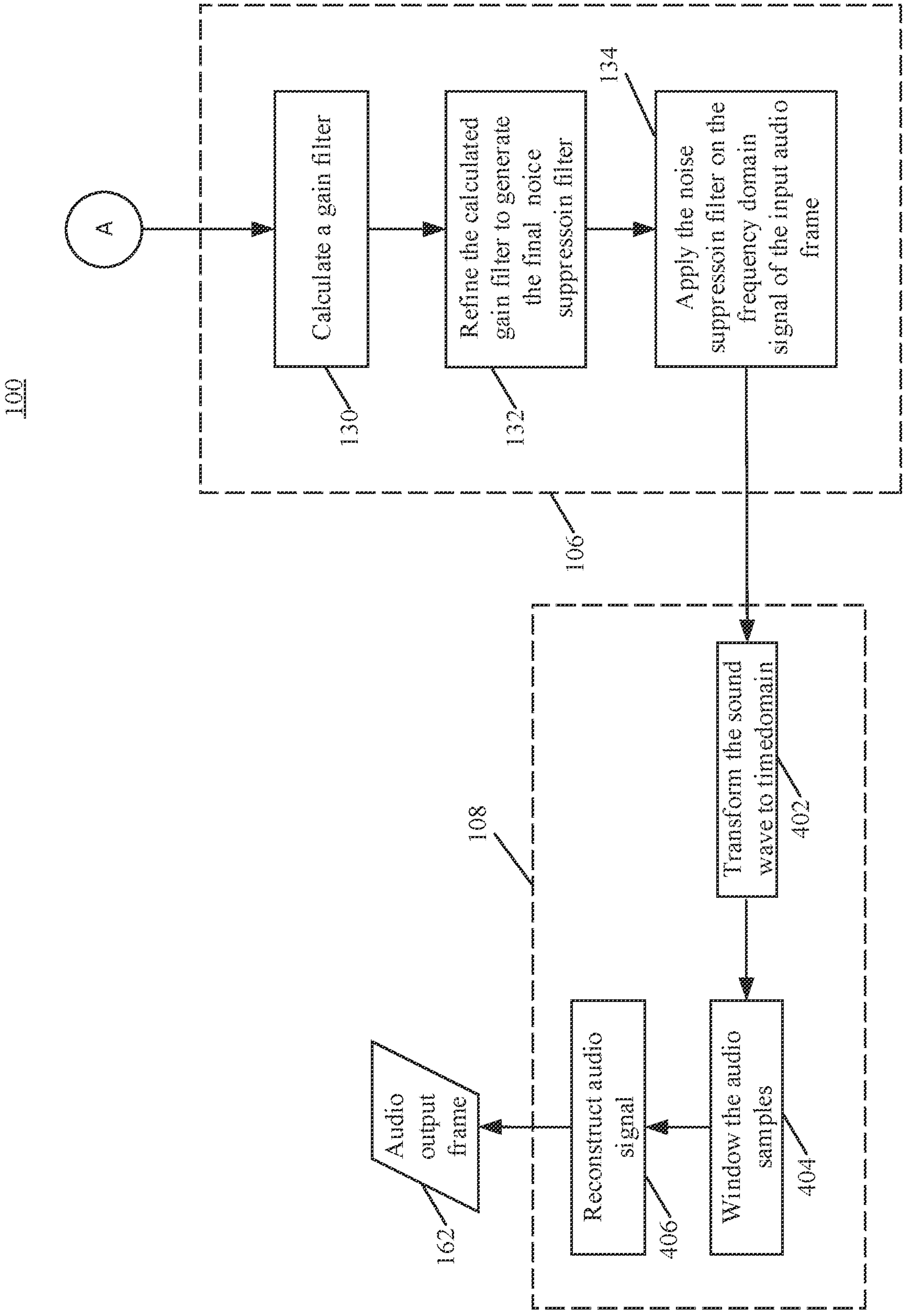
FIG. 4 is a flowchart depicting a process by which an electronic device suppresses noise from audio signals in accordance with this disclosure.

In one implementation, the signal analysis process 102 includes buffering, windowing and discrete Fourier transforming (DFT), while the signal synthesis process 108 includes inverse discrete Fourier transforming, windowing and overlap adding. Such elements are further illustrated in FIGS. 3 and 4. Referring to FIGS. 3 and 4, at 302, the noise suppression software application 522 buffers audio samples of the audio input frame 160. At 302, the noise suppression software application 522 stores audio samples in a buffer of memory. The audio samples are stored, edited, referenced or otherwise processed.

At 304, the noise suppression software application 522 windows the buffered audio samples. At 304, the noise suppression software application 522 windows the audio samples by, for example, multiplying the signal by a hamming or sine waveform stored in the buffer. The windowing process 304 is a process of shaping the buffered audio samples before transforming them to the frequency domain. It reduces spectral leakage by attenuating the measured sample buffer at its end points to eliminate discontinuities. Windowing is important for reducing the false frequencies from discontinuities in the input waveform. It is also important to smooth out any discontinuities that occur in the resynthesized time-domain waveform. At 306 the noise suppression software application 522 transforms the time-domain representation of the sound wave of the audio input frame 160 (i.e., the windowed audio samples or windowed audio wave) into a frequency domain spectrum. In one implementation, the transformation is a DFT transformation.

Referring to FIG. 4, at 402, the noise suppression software application 522 performs a reverse transformation of that at 306. In one implementation, at 402, the noise suppression software application 522 transforms the frequency domain spectrum of a representation of the sound wave back into the time domain waveform. At 404, the noise suppression software application 522 windows the audio samples of the sound wave in the time domain wave form. At 406, the noise suppression software application 522 reconstruct the audio signal using, for example the mathematical tool Overlap Add.

Figure 5:
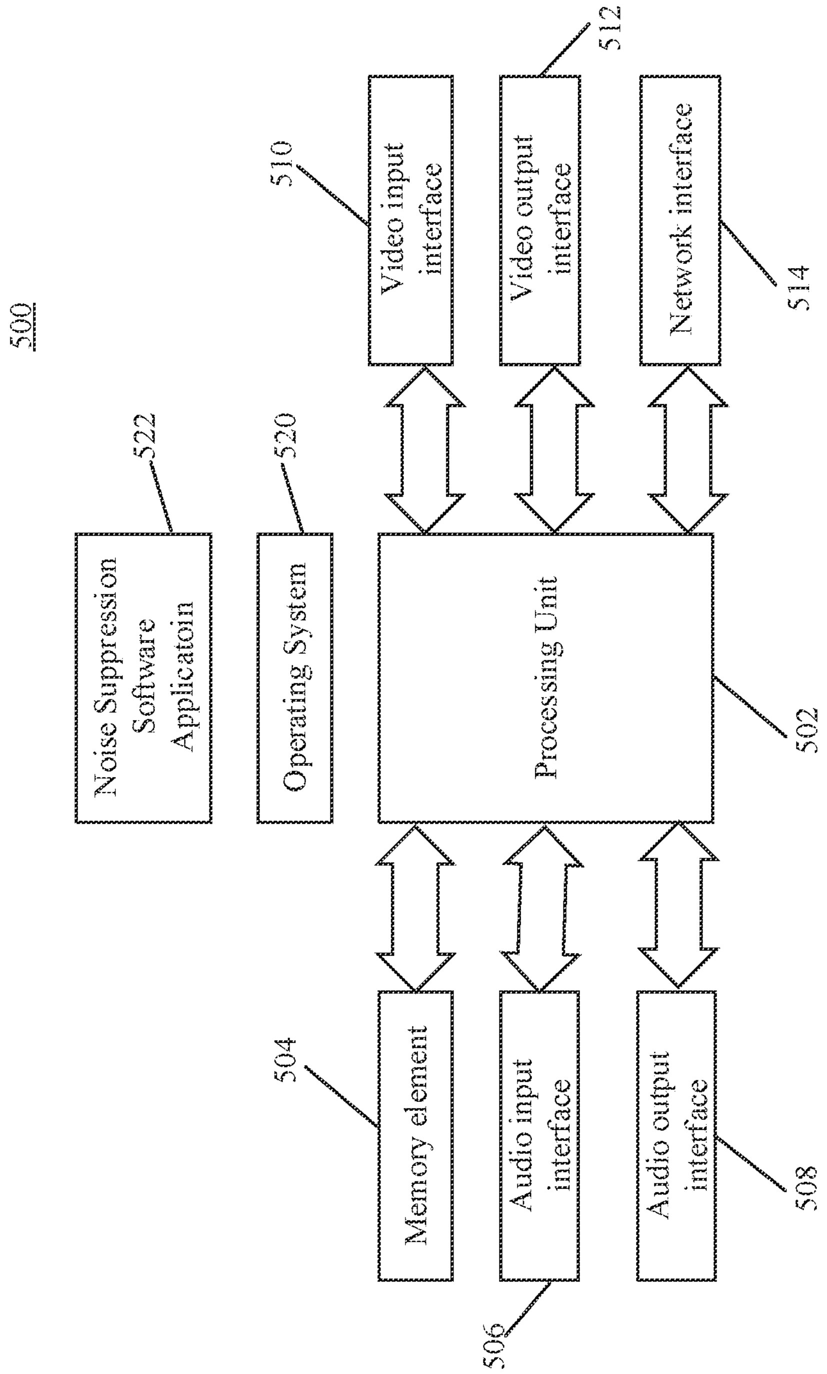
FIG. 5 is a block diagram illustrating an electronic device for suppressing noise from audio signals in accordance with this disclosure.

Referring to FIG. 5, a block diagram illustrating the electronic device is shown and generally indicated at 500. The electronic device 500 includes a processing unit 502, some amount of memory 504 operatively coupled to the processing unit 502, an audio input interface (such as a microphone) 506 operatively coupled to the processing unit 502, an audio output interface (such as a speaker) 508 operatively coupled to the processing unit 502, a video input interface (such as a camera) 510 operatively coupled to the processing unit 502, a video output interface (such as a display screen) 512 operatively coupled to the processing unit 502, and a network interface (such as a WiFi network interface) 514 operatively coupled to the processing unit 502. The electronic device 500 also includes an operating system (such as iOS®, Android®, Windows®, Linus®, etc.) 520 running on the processing unit 502. The noise suppression software application is indicated at 522. It is adapted to loaded and executed on the electronic device 500 by the operating system 520. The noise suppression computer software application 522 is implemented using one or more computer software programming languages, such as C, C++, C#, Java, etc.

In accordance with the present teachings, noise suppression using statistical signal processing incorporates AI-based noise suppression features to form a fusion system and method of suppressing noise from audio signals. The fusion method for noise suppression incorporates the prior knowledge of rules and features, and can model and suppress unusual complex noise cases. Noise suppression using AI incorporates the ability of statistical method based noise suppression to form a fusion system and method to suppress noise from audio signals. The fusion scheme learns noises from training data, and models noises with prior knowledge about noises. The fusion scheme provides the benefit of avoiding the complex training-test-retraining process. It is also capable of fine tuning and enhancing the rules and/or features about noises to respond to minor online problems quickly.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method for suppressing noise from audio signal, said method performed by a noise suppression computer software application and comprising:

1) retrieving an audio input signal in time domain;

2) analyzing said audio input signal to map said audio input signal to a frequency domain signal;

3) determining a speech presence probability from said frequency domain signal;

4) performing an artificial intelligence (AI) analysis on said frequency domain signal to obtain a voice activity detection (VAD) knowledge and an AI based noise estimation result using a neural network;

5) performing noise estimation with said speech presence probability and said voice activity detection knowledge using a statistical noise estimation method to obtain a statistically estimated noise;

6) detecting voice activity in said frequency domain signal by applying a VAD model on said AI based noise estimation result to filter out incorrectly estimated noise signal included in said AI based noise estimation result that is obtained using a neural network and obtain a neural network estimated noise, and preserving desired speech signal included in said AI based noise estimation result;

7) merging said statistically estimated noise and said neural network estimated noise to generate a final noise estimation result, wherein merging said statistically estimated noise and said neural network estimated noise helps to suppress more noise;

8) calculating a gain filter from said final noise estimation result;

9) applying said gain filter to said frequency domain signal to suppress noise from said frequency domain signal to generate an enhanced speech signal; and 10) converting said enhanced speech signal to a noise suppressed speech signal in time domain.

2. The method of claim 1 wherein said speech presence probability is estimated by:

1) extracting a set of speech features from said frequency domain signal; and 2) mapping said set of speech features to said speech presence probability.

3. The method of claim 2 wherein said set of speech features includes at least one of a signal classification feature, a speech/noise log likelihood ratio, a post signal to noise ratio, and a prior signal to noise ratio.

4. The method of claim 1 wherein said neural network is Recurrent Neural Network (RNN).

5. The method of claim 1 wherein said statistically estimated noise is obtained using a time recursive average formula.

6. The method of claim 1 wherein said noise suppression computer software application merges said statistically estimated noise and said neural network estimated noise using a maximum operator.

7. The method of claim 1 wherein said gain filter is a log Minimum Mean-Square Error filter.

8. The method of claim 1 wherein said gain filter is refined using a smoothing process before said gain filter is applied to said frequency domain signal.

9. The method of claim 1 wherein analyzing said audio input signal comprises buffering audio samples of said audio input signal, windowing said buffered audio input signal and transforming said windowed audio samples into said frequency domain signal.

10. The method of claim 9 wherein windowing said buffered audio input signal includes multiplying said buffered audio input signal by a hamming or sine waveform, and transforming said windowed audio samples includes a discrete Fourier transformation.

* * * * *